United States Patent
Cakmakci (12) United States Patent (10) Patent No.: US 11,237,394 B2
(45) Date of Patent: Feb. 1, 2022

(54) FREEFORM HEAD MOUNTED DISPLAY

(71) Applicant: GOOGLE LLC, Mountain View, CA (US)

(72) Inventor: Ozan Cakmakci, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/720,705

(22) Filed: Dec. 19, 2019

(65) Prior Publication Data

US 2020/0124858 A1  Apr. 23, 2020

Related U.S. Application Data

(62) Division of application No. 15/437,694, filed on Feb. 21, 2017, now Pat. No. 10,545,342.

(51) Int. Cl.
*G02B 27/01* (2006.01)
*G02B 17/08* (2006.01)

(52) U.S. Cl.
CPC ......... *G02B 27/0172* (2013.01); *G02B 17/08* (2013.01); *G02B 17/0852* (2013.01); *G02B 27/0176* (2013.01); *G02B 2027/013* (2013.01); *G02B 2027/0107* (2013.01); *G02B 2027/0112* (2013.01); *G02B 2027/0132* (2013.01); *G02B 2027/0145* (2013.01); *G02B 2027/0152* (2013.01); *G02B 2027/0174* (2013.01); *G02B 2027/0178* (2013.01)

(58) Field of Classification Search
CPC ............ G02B 27/0172; G02B 27/0176; G02B 2027/0112; G02B 2027/0132; G02B 2027/0145; G02B 2027/0152; G02B 2027/0174; G02B 2027/0178
USPC .......................................................... 359/13
See application file for complete search history.

(56) References Cited

U.S. PATENT DOCUMENTS

| 2006/0119951 | A1 | 6/2006 | McGuire, Jr. |
| 2016/0131907 | A1 | 5/2016 | Martinez et al. |
| 2016/0139412 | A1 | 5/2016 | Sawada et al. |

OTHER PUBLICATIONS

Office Action dated Mar. 3, 2021 for Indian Patent Application No. 201947028071, 6 pages.
International Preliminary Report on Patentability dated Sep. 6, 2019 for corresponding International Application No. PCT/US2017/058489, 9 pages.
Office Action dated Dec. 28, 2020 for Chinese Patent Application No. 201780083509.9, 15 pages.

*Primary Examiner* — Wen Huang (57) ABSTRACT

An optical apparatus for a near-eye display includes a microdisplay to emit image light and one or more field lenses positioned to receive the image light from the microdisplay. The one or more field lenses have a combined optical power to form a curved intermediate image. A freeform combiner, having an eyeward side and an external side, is positioned to receive the image light from the one or more field lenses and reflect the image light. A curved intermediate image is formed between the freeform combiner and the one or more field lenses.

17 Claims, 8 Drawing Sheets

FREEFORM HEAD MOUNTED DISPLAY

CROSS-REFERENCE TO RELATED APPLICATIONS

The presentation application is a divisional application of U.S. patent application Ser. No. 15/437,694, entitled "FREEFORM HEAD MOUNTED DISPLAY" and filed on Feb. 21, 2017, the entirety of which is incorporated by reference herein.

TECHNICAL FIELD

This disclosure relates generally to head worn displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus and method for a freeform head mounted display (HMD) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
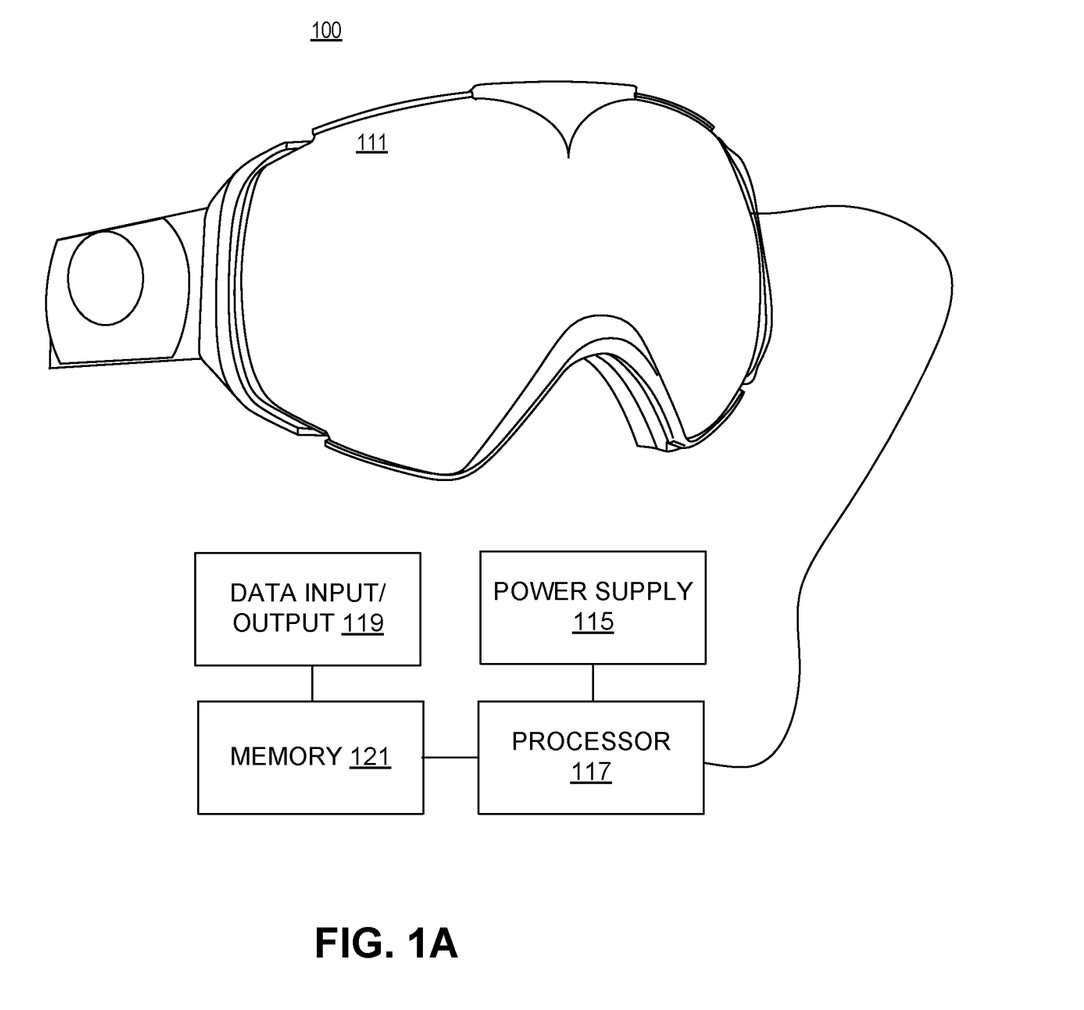
FIG. 1A is an illustration of a head mounted display, in accordance with an embodiment of the disclosure.

FIG. 1A is an illustration of head mounted display 100, in accordance with an embodiment of the disclosure. FIG. 1A includes an optical system (like those depicted later in FIGS. 2A-2D) included in frame assembly 111. Head mounted display 100 is electrically coupled to power supply 115, processor 117, memory 121, and data input/output 119. All of these components may be internal or external to head mounted display 100.

As stated, contained within head mounted display 100 is an optical system to display an image in an eye of a user. Frame assembly 111 holds the optical system in place so that it can focus light into the eye of the user. As shown, frame assembly 111 is configured to attach to the head of the user (in the depicted embodiment this occurs with an elastic or adjustable strap that wraps around the head of the user). In other embodiments, attachment to the user's head may be accomplished with glasses-like struts that attach behind the ears of the user, or attachment may be achieved through any other attachment method. The optical system may be mounted in a variety of ways inside frame assembly 111. For instance, a freeform combiner may be placed directly in front of the user's eyes to completely immerse the user in the images being displayed. Alternatively, the front of head mounted display 100 may be transparent or partially transparent, and the freeform combiner may only be partially disposed in front of the user, allowing the user to interact with the outside world and also see generated images. This may be important in a heads-up display application for pilots or the like.

The optical system in head mounted display 100 is coupled to processor 117 to receive both the power and data needed to produce complex images. Moreover, a microdisplay (see infra FIG. 2A, micro display 201) may also receive power from power supply 115. In the depicted embodiment, data input/output 119 may be a port or a wireless transmitter/receiver to contact the internet (or any other data transmission technology). In one embodiment, the user may provide input to adjust the display settings to accommodate the user's own head shape and how head mounted display 100 fits on their face. Moreover, data input/output 119 may be coupled to part of a gaming system for example a controller or the like. Memory 121 may be one or more of RAM, ROM, flash, SDD, or the like. Head mounted display 100 may couple by wire or wirelessly to a media input such as a computer or gaming system.

Figure 1B:
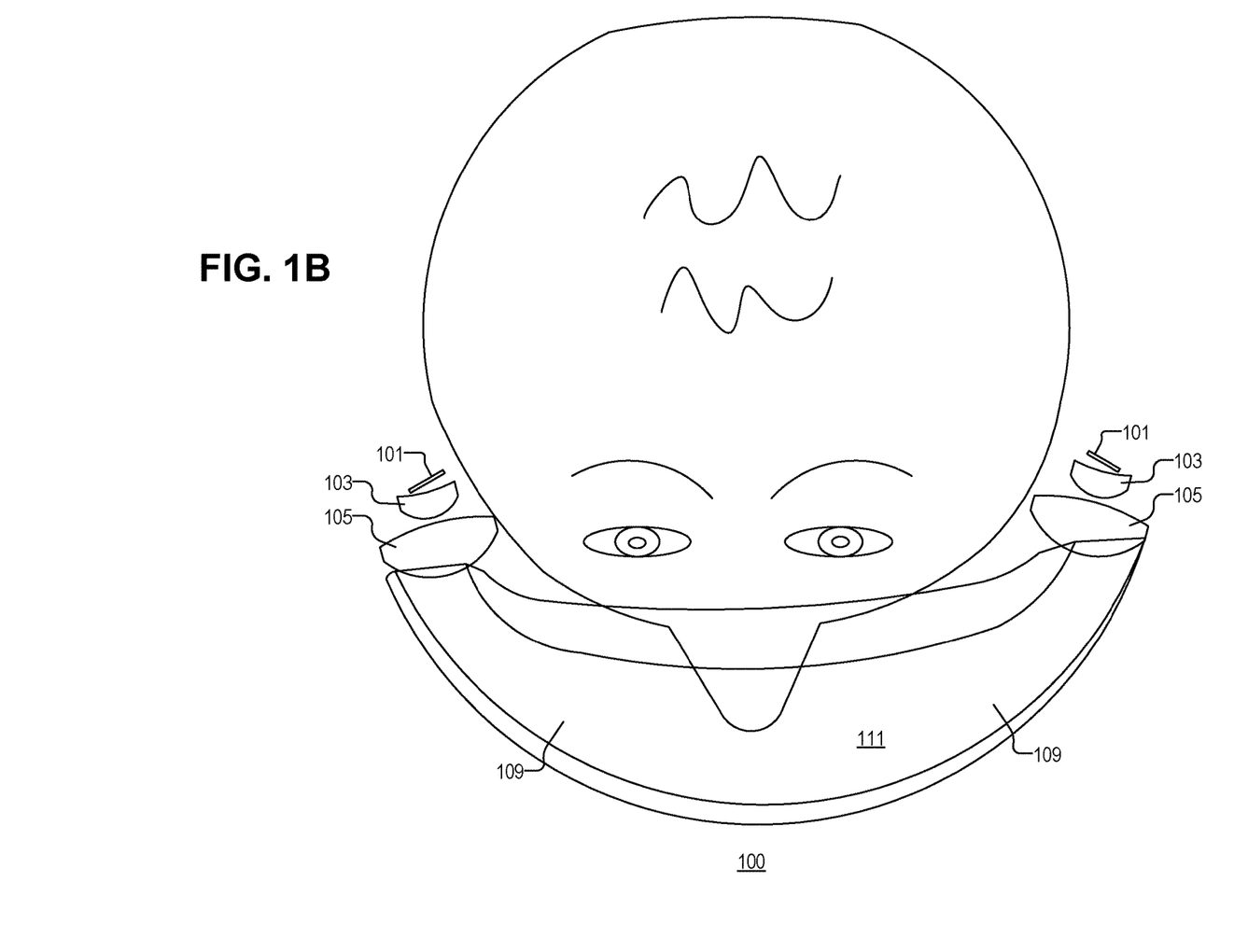
FIG. 1B is a top-down illustration of a head mounted display, in accordance with an embodiment of the disclosure.

FIG. 1B is a top-down illustration of head mounted display (HMD) 100, in accordance with an embodiment of the disclosure. One of ordinary skill in the art will appreciate the diagram depicted omits certain features of the display (e.g., wires and microelectronic circuitry) and parts of frame assembly 111 (e.g., struts to hold the display on the head of the user).

As shown in the top-down illustration, the optical system in HMD 100 includes microdisplay 101, first field lens 103, second field lens 105, and freeform combiner 109. Microdisplay 101 is disposed to emit image light in a direction away from the user of HMD 100. One or more field lenses 103/105 are positioned to receive the image light from microdisplay 101 and form a curved intermediate image between second field lens 105 and freeform combiner 109. Freeform combiner 109 is positioned to receive the image light and reflect the image light into the eye of the user. Frame assembly 111 supports the optical system on the head of the user with freeform combiner 109 aligned to the eye. In the depicted embodiment, freeform combiner is part of frame assembly—as in it is built into the wall of the frame in front of the user's eyes. Additionally, as shown one single freeform combiner 109 spans the entire area in front of the user's eyes. However in other embodiment, freeform combiner 109 may be two discrete elements disposed in front of each of the user's eyes.

As shown in the depicted embodiment, HMD 100 has two optical systems (a first and a second); in the second optical system, a second microdisplay 101 and a second one or more field lenses 103/105 are disposed on an opposite side of HMD 100 as the first microdisplay 101 and the first one or more field lenses 103/105. In other words each optical system may be located proximate to a temple of the user. However in other embodiments, one optical system may be able to display an image to both eyes of the user. In other embodiments, however, it may only be desirable to have one optical system and produce an image in a single eye of the user. While in the illustrated embodiment, the optical systems may be disposed on opposite sides of the user's head, in other embodiments the optical systems may be disposed above or below the user's eyes, or anywhere else to facilitate displaying the image to at least one eye of the user.

Since HMD 100 may be worn for an extended time, in some embodiments, weight may be an important consideration. In these embodiments, first field lens 103 and second field lens 105 may include plastic. For example EP5000 with an abbe number of ~23 may be used for first field lens 103, while Zeonex E8R with an abbe number of ~56 may be used for second field lens 105. In other embodiments other plastics with similar chemical compositions and/or indices of refraction may be used.

Figure 2A:
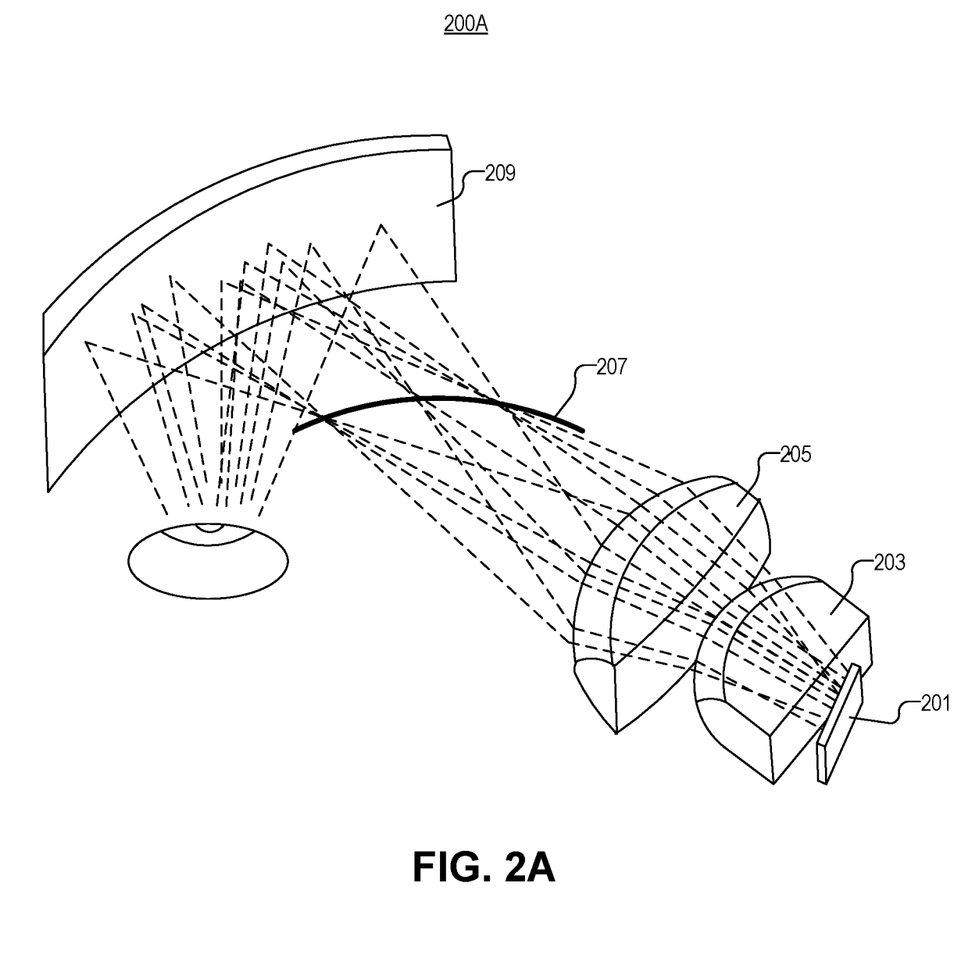
FIG. 2A is an illustration of an optical apparatus included in a head mounted display, in accordance with an embodiment of the disclosure.

FIG. 2A is an illustration of an optical apparatus 200A (i.e., an optical system) included in a head mounted display (e.g., HMD 100), in accordance with an embodiment of the disclosure. As shown microdisplay 201 emits image light and one or more field lenses 203/205 are positioned to receive the image light from microdisplay 201. One or more field lenses 203/205 have a combined optical power that forms curved intermediate image 207. Moreover the lenses may not only focus but also color correct the image light output from microdisplay 201. Freeform combiner 209 has an eyeward side and an external side; the eyeward side is positioned to receive image light from one or more field lenses 203/205 and reflect the image light. Curved intermediate image 207 is formed between freeform combiner 209 and one or more field lenses 203/205. In the depicted embodiment, curved intermediate image 207 is concave towards second field lens 205 and also has a similar curvature as freeform combiner 209. In the illustrated embodiment, curved intermediate image 207 is in-focus in a curved image plane, and curved intermediate image 207 is formed in free space between freeform combiner 209 and one or more field lenses 203/205 (where rays of the image light intersect). Also, freeform combiner 209 is a reflective freeform combiner 209, but as will be shown in other embodiments, freeform combiner 209 may be a Fresnel lens or a hologram.

Figure 2B:
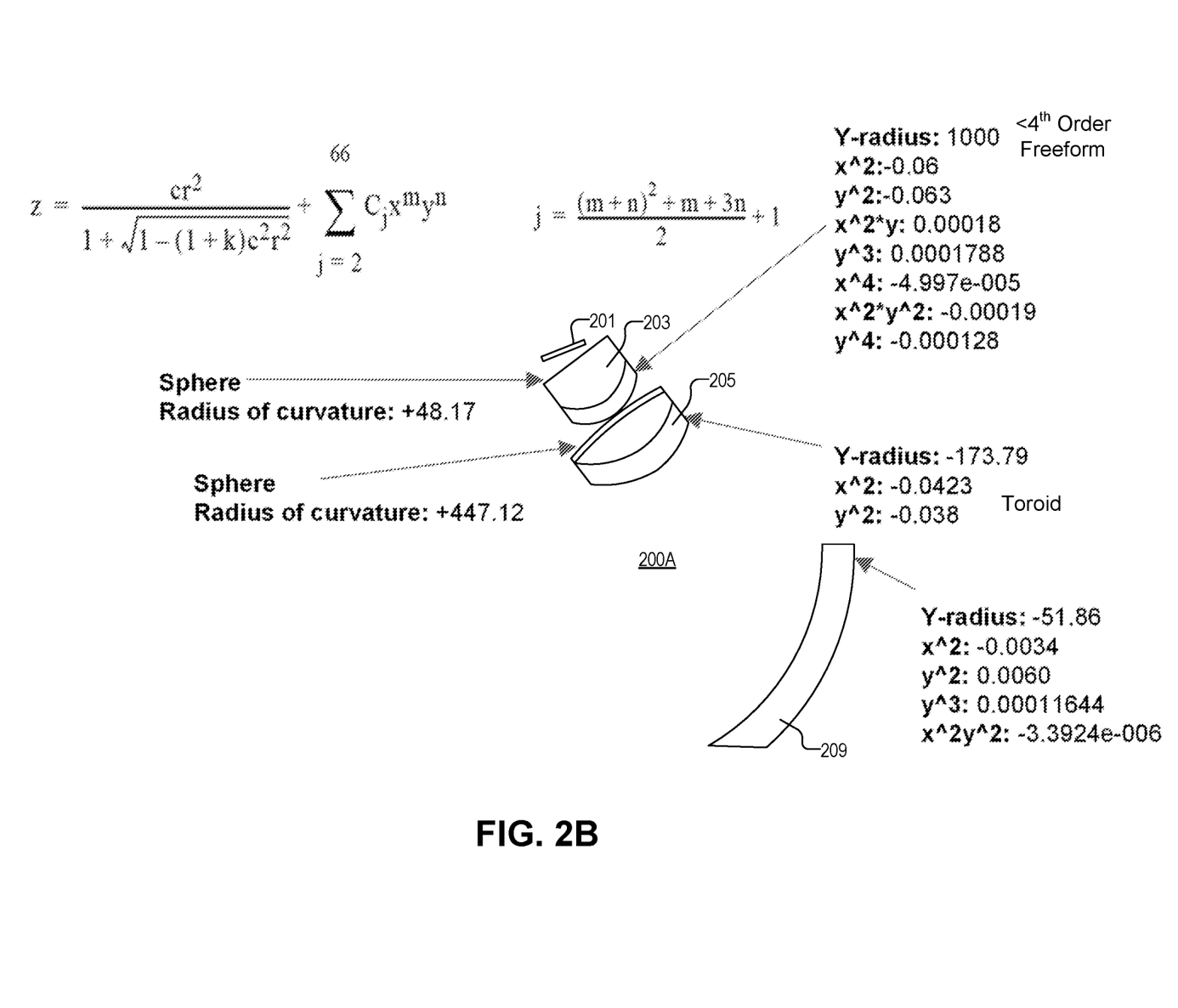
FIG. 2B is an illustration of an optical apparatus included in a head mounted display, in accordance with an embodiment of the disclosure.

FIG. 2B is an illustration of optical apparatus 200A included in a head mounted display, in accordance with an embodiment of the disclosure. More specifically, depicted is one embodiment of the optical specifications (e.g., the equation governing the lens system, and the coefficients governing each lens surface) for optical apparatus 200A. First field lens 203 has a convex spherical surface and a freeform surface opposite the convex spherical surface. Second field lens 205 has a convex spherical surface and a toroidal surface opposite the convex spherical surface. First field lens 203 is optically disposed between second field lens 205 and microdisplay 201; second field lens 205 is optically disposed between first field lens 203 and reflective freeform combiner 209. It is worth noting that in some embodiments, to simplify optical design, the vertex of first field lens 203 and the vertex of second field lens 205 are aligned to optically center the one or more field lenses 203/205. In other words, the one or more field lenses 203/205 share the same coordinate system (e.g., second field lens 205 is not tilted or decentered with respect to the first field lens 203). As stated above, first field lens 203 and second field lens 205 may have different abbe numbers for the purpose of color correction. For example EP5000 with an abbe number of 23 may be used for first field lens 203, while Zeonex E8R with an abbe number of 56 may be used for second field lens 205. Thus, the abbe number of first field lens 203 is less than the abbe number of second field lens 205 (e.g., the second abbe number is at least two times larger than the first abbe number). Also shown is that the freeform surface of first field lens 203 may be described by a polynomial with a 4th order term, or lower order terms, to reduce sensitivity. In one embodiment, one or more field lenses 203/205 are ~12 mm thick each (center) and lens dimensions are ~20 mm×~20 mm for the aperture. Moreover, freeform combiner 209 may have dimensions of ~40 mm×~40 mm.

In one embodiment, microdisplay 201 has 3600 pixels to attain 1 arcmin/pixel resolution and a 60° viewing angle. Accordingly, microdisplay 201 may have 2880 by 2160 pixels. In the depicted embodiment of optical apparatus 200A, the long dimension may be about 9.3 mm and the short dimension may be about 4.8 mm. This may require a pixel size of ~3.2 microns for the long dimension for 1 arcminute resolution.

Figure 2C:
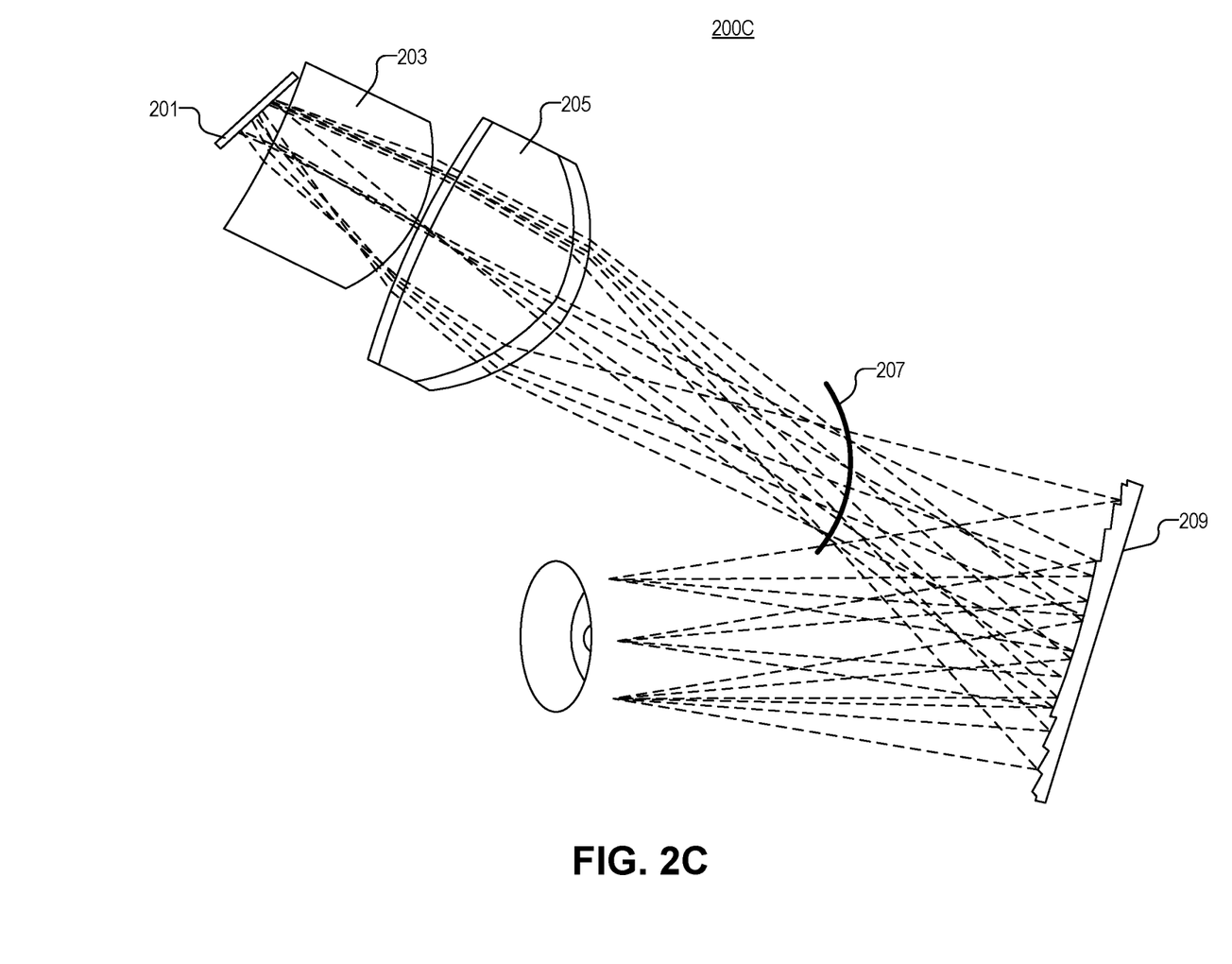
FIG. 2C is an illustration of an optical apparatus included in a head mounted display, in accordance with an embodiment of the disclosure.

FIG. 2C is an illustration of optical apparatus 200C included in a head mounted display, in accordance with an embodiment of the disclosure. Optical apparatus 200C is similar in many respects to optical apparatus 200A; however, one difference is that freeform combiner 209 is a freeform Fresnel lens. In some embodiments this may be useful to condense the profile of a head mounted display (e.g., HMD 100). For instance, in the depicted embodiment, one side of freeform combiner 209 is flat, potentially allowing it to fit into a smaller head wearable device than a larger curved structure. In this embodiment freeform combiner 209 may have a sag depth of less than 1 mm, and the zone widths may be optimized such that the zones do not diffract light. In a different embodiment, freeform combiner 209 may be holographic to achieve a similar result. For example, a color corrected flat hologram may be used as a freeform combiner (see e.g., FIG. 2E).

Figure 2D:
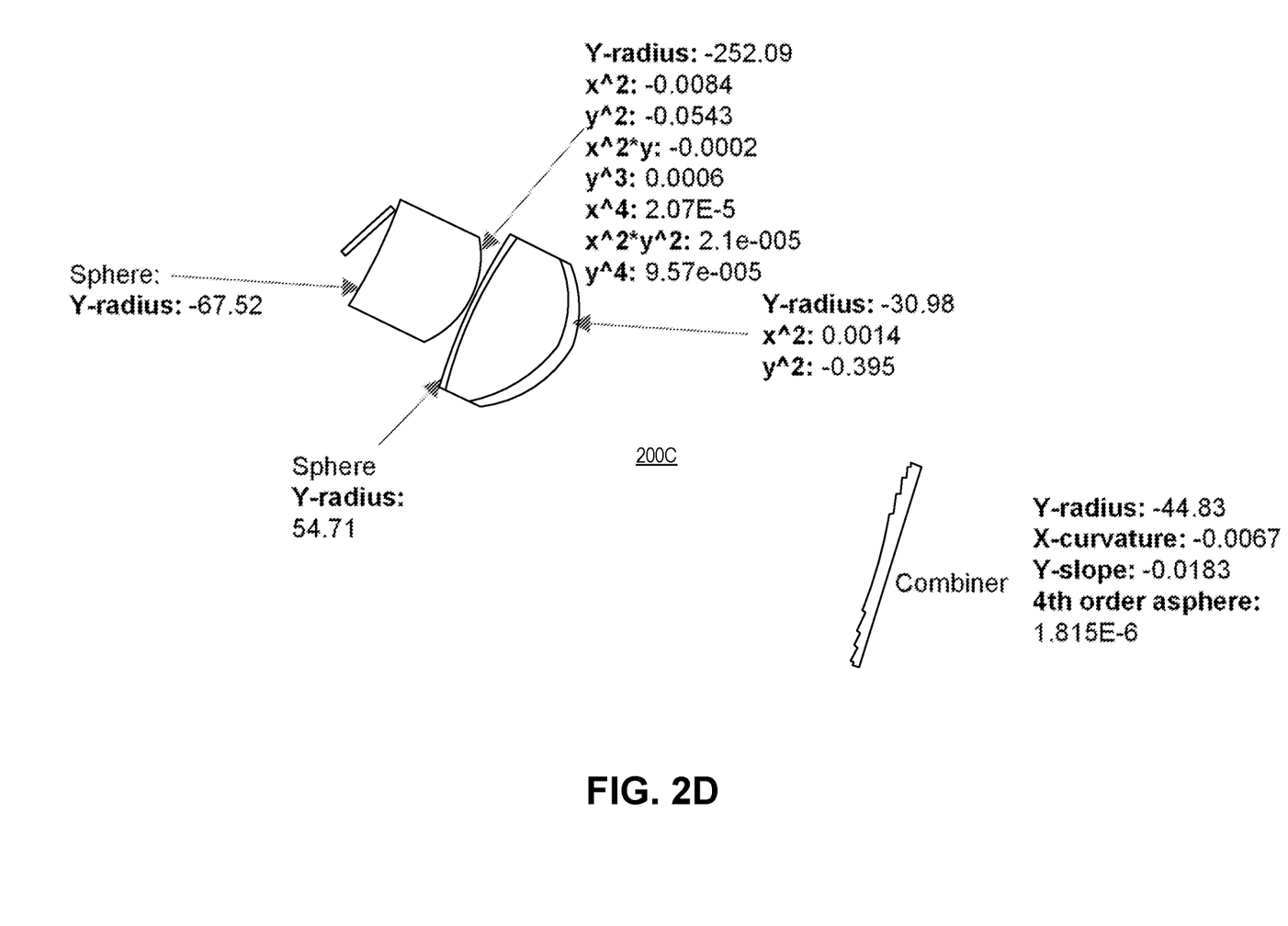
FIG. 2D is an illustration of an optical apparatus included in a head mounted display, in accordance with an embodiment of the disclosure.

FIG. 2D is an illustration of optical apparatus 200C included in a head mounted display, in accordance with an embodiment of the disclosure. More specifically, depicted is one example of the optical specifications (e.g., the coefficients governing each lens surface) for optical apparatus 200C. Although the coefficients governing the lenses/combiner may be different from optical apparatus 200A, the operation of both optical apparatus 200A and 200C is largely similar. One difference is that in the depicted embodiment, first field lens 203 has a concave spherical surface and a freeform surface opposite the concave spherical surface. Second field lens 205 has a convex spherical surface and a toroidal surface opposite the convex spherical surface. One of ordinary skill in the art will appreciate that optical apparatus 200C may take any number of permutations in accordance with the teachings of the present disclosure.

Figure 2E:
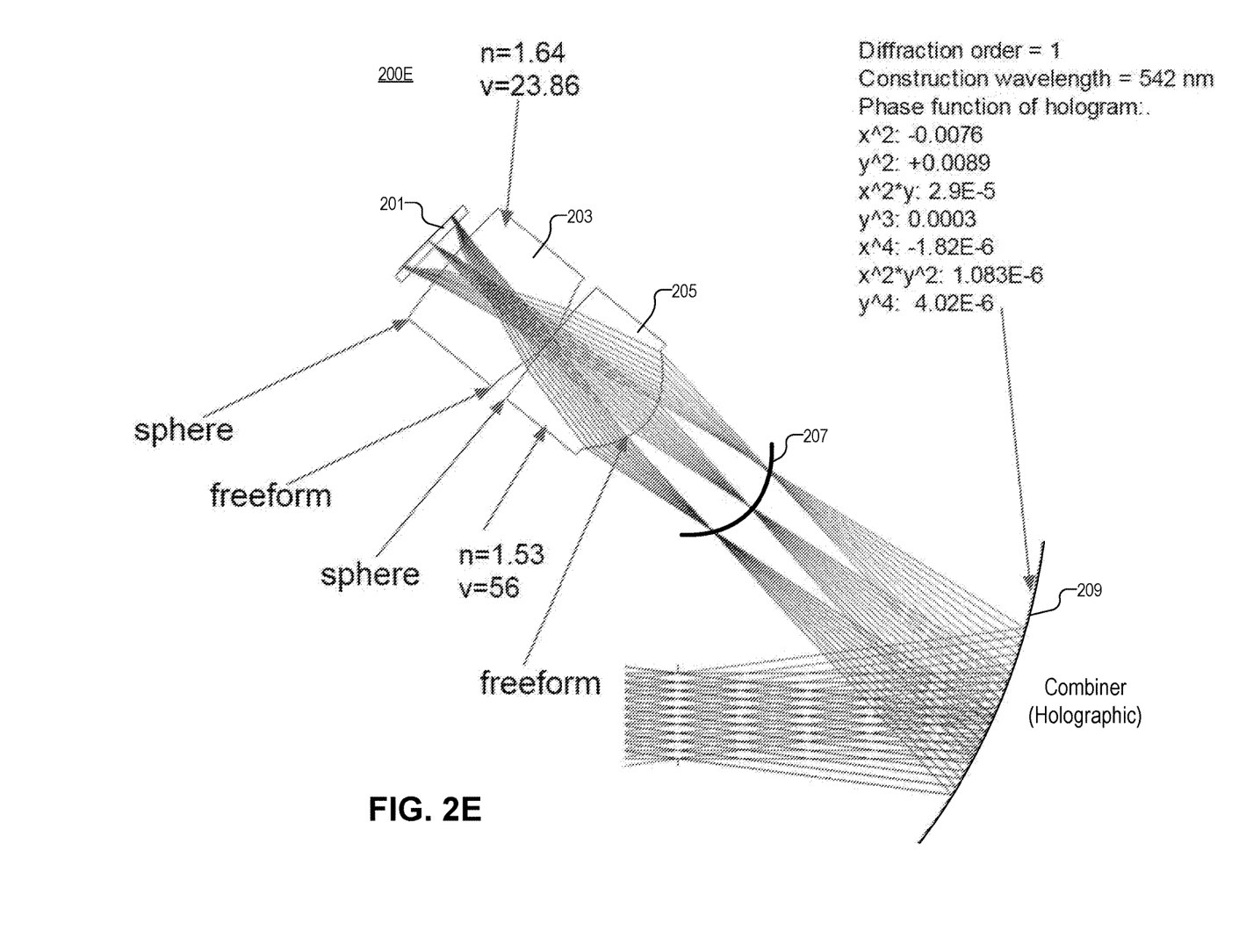
FIG. 2E is an illustration of an optical apparatus included in a head mounted display, in accordance with an embodiment of the disclosure.

FIG. 2E is an illustration of optical apparatus 200E included in a head mounted display, in accordance with an embodiment of the disclosure. Optical apparatus 200E is similar in many respects to optical apparatus 200A; however, one difference is that freeform combiner 209 is a holographic optical combiner. In one embodiment, the hologram can be achromatic. In some embodiments this may be useful to condense the profile of a head mounted display (e.g., HMD 100). As shown first field lens 203 has a spherical surface (closest to microdisplay 201) and a freeform surface opposite the spherical surface. Second field lens 205 has a spherical surface (closest to the first field lens) and a freeform surface opposite the spherical surface. Curved intermediate image 207 is disposed between the second field lens 205 and freeform combiner 209. The optical coefficients governing this embodiment of the disclosure are depicted.

Figure 3:
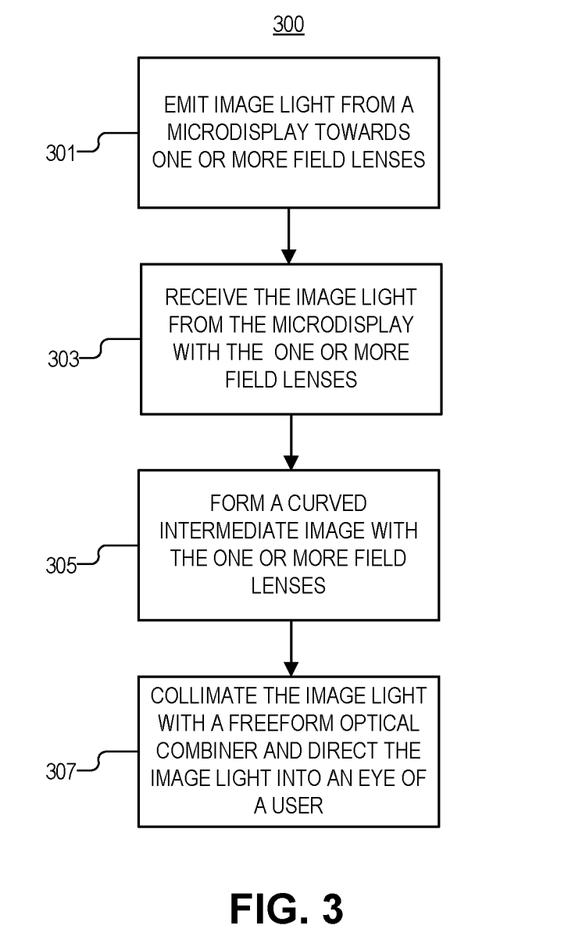
FIG. 3 is an illustration of a method for optical magnification, in accordance with an embodiment of the disclosure.

FIG. 3 is an illustration of method 300 for optical magnification, in accordance with an embodiment of the disclosure. The order in which some or all of process blocks 301-307 appear in method 300 should not be deemed limiting. Rather, one of ordinary skill in the art having the benefit of the present disclosure will understand that some of method 300 may be executed in a variety of orders not illustrated, or even in parallel. Additionally, method 300 may include additional blocks or have fewer blocks than shown, in accordance with the teachings of the present disclosure.

Block 301 shows emitting image light from a microdisplay towards one or more field lenses. In some embodiments, the microdisplay may be planar, so the image emitted from the microdisplay may need to be adjusted so a complete in-focus image is formed in the eye of the user after the light passes through the intermediate optics in the system. In some embodiments, the user may adjust the image to optimize their viewing experience depending on how the head mounted display fits on their head. In other embodiments this may occur in the factory after the lens assembly is fabricated/aligned.

Block 303 illustrates receiving the image light from the microdisplay with the one or more field lenses. In one embodiment, receiving the image light from the microdisplay with one or more field lenses includes receiving the image light with a first field lens, where a first surface of the first field lens has a concave spherical radius of curvature. The image light is then refracted from a second surface of the first field lens (opposite the first surface of the first field lens) where the second surface of the first field lens is a freeform surface. Moreover, the image light may be received with a second field lens, where a first surface of the second field lens has a convex spherical radius of curvature. The light may then be refracted from the second field lens from a second surface of the second field lens (opposite the first surface of the second field lens) where the second surface of the second field lens is toroidal.

Block 305 describes forming a curved intermediate image with the one or more field lenses. In one embodiment the curved intermediate image may be formed by the light refracted from the toroidal surface of the second field lens. The curved intermediate image may be in-focus in a curved image plane, and the curved intermediate image is formed in free space between the freeform combiner and the one or more field lenses where rays of the image light intersect. However in another embodiment, the intermediate image may be formed in some other medium such as plastic, depending on the optical system employed.

Block 307 shows combining the image light with a freeform optical combiner and directing the image light into an eye of a user. As stated above, combining the image light may include using one of a reflective combiner, a reflective Fresnel combiner, or a holographic combiner. The curved intermediate image may be disposed between the one or more field lenses and the freeform optical combiner, and the concave surface of the curved intermediate image faces the one or more field lenses.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display system comprising:
   an optical system including:
   a microdisplay disposed to emit image light in a direction away from a user of the head mounted display system;
   one or more field lenses positioned to receive the image light from the microdisplay and form a curved intermediate image along a curved image plane of the one or more field lenses; and
   a freeform combiner positioned to receive the image light and reflect the image light into an eye of the user, wherein the curved image plane is disposed between the one or more field lenses and the freeform combiner; and a frame assembly to support the optical system on a head of the user with the freeform combiner aligned to the eye, wherein the frame assembly holds the microdisplay and the one or more field lenses are proximate to an ear side of the head of the user when the head mounted display system is worn by the user, wherein the one or more field lenses include:
a first field lens with a first spherical surface and a freeform surface opposite the first spherical surface; and
a second field lens with a second spherical surface and a toroidal surface opposite the second spherical surface, and wherein the first field lens is optically disposed between the second field lens and the microdisplay, and the second field lens is optically disposed between the first field lens and the freeform combiner, and wherein a first abbe number of the first field lens is less than a second abbe number of the second field lens.

2. The head mounted display system of claim 1, wherein a first vertex of the first field lens and a second vertex of the second field lens are aligned to optically center the one or more field lenses.

3. The head mounted display system of claim 2, wherein the first field lens and the second field lens include plastic.

4. The head mounted display system of claim 1, further comprising a second optical system, wherein a second microdisplay and a second one or more field lenses in the second optical system are disposed on an opposite ear side of the head mounted display system as the microdisplay and the one or more field lenses.

5. The head mounted display system of claim 1, wherein the freeform combiner is one of a reflective combiner, or a reflective Fresnel combiner, and wherein at least one side of the reflective Fresnel combiner is planar.

6. A method of optical magnification, comprising:
emitting image light from a microdisplay towards one or more field lenses in a direction away from a user;
receiving the image light from the microdisplay with the one or more field lenses;
forming a curved intermediate image with the one or more field lenses;
combining the image light with a freeform optical combiner and reflecting the image light into an eye of the user, wherein the curved intermediate image is disposed between the one or more field lenses and the freeform optical combiner, and wherein a concave surface of the curved intermediate image faces the one or more field lenses, and
wherein the one or more field lenses include:
a first field lens with a first spherical surface and a freeform surface opposite the first spherical surface; and
a second field lens with a second spherical surface and a toroidal surface opposite the second spherical surface, and wherein the first field lens is optically disposed between the second field lens and the microdisplay, and the second field lens is optically disposed between the first field lens and the freeform combiner, and wherein a first abbe number of the first field lens is less than a second abbe number of the second field lens.

7. The method of optical magnification of claim 6, wherein receiving the image light from the microdisplay with one or more field lenses includes:
receiving the image light with a first field lens, wherein a first surface of the first field lens has a concave spherical radius of curvature;
refracting the image light from the first field lens from a second surface of the first field lens opposite the first surface of the first field lens, wherein the second surface of the first field lens is a freeform surface;
receiving the image light with a second field lens, wherein a first surface of the second field lens has a convex spherical radius of curvature; and
refracting the image light from the second field lens from a second surface of the second field lens opposite the first surface of the second field lens, wherein the second surface of the second field lens is toroidal.

8. The method of optical magnification of claim 6, wherein combining the image light includes using one of a reflective combiner, a reflective Fresnel combiner, or a holographic combiner.

9. The method of optical magnification of claim 6, further comprising adjusting color in the image light output from the microdisplay to optimize an image in the eye of the user.

10. The method of optical magnification of claim 6, wherein emitting image light from the microdisplay includes emitting image light from a planar microdisplay.

11. A method, comprising:
emitting, from a first microdisplay of a head mounted display system, image light in a direction away from a user of the head mounted display system;
receiving the image light from the microdisplay at one or more field lenses and forming a curved intermediate image along a curved image plane of the one or more field lenses; and
receiving the image light at a freeform combiner and reflecting the image light into an eye of the user, wherein the curved image plane is disposed between the one or more field lenses and the freeform combiner,
wherein a frame assembly holds the first microdisplay and the one or more field lenses are proximate to an ear side of the head of the user when the head mounted display system is worn by the user,
wherein the one or more field lenses include:
a first field lens with a first spherical surface and a freeform surface opposite the first spherical surface; and
a second field lens with a second spherical surface and a toroidal surface opposite the second spherical surface, and wherein the first field lens is optically disposed between the second field lens and the first microdisplay, and the second field lens is optically disposed between the first field lens and the freeform combiner, and wherein a first abbe number of the first field lens is less than a second abbe number of the second field lens.

12. The method of claim 11, wherein a first vertex of the first field lens and a second vertex of the second field lens are aligned to optically center the one or more field lenses.

13. The method of claim 12, wherein the first field lens and the second field lens include plastic.

14. The method of claim 11, wherein the frame assembly holds a second microdisplay and a second one or more field lenses disposed on an opposite ear side of the head mounted display system as the first microdisplay and the one or more field lenses.

15. The head mounted display system of claim 11, wherein the freeform combiner is one of a reflective combiner, or a reflective Fresnel combiner, and wherein at least one side of the reflective Fresnel combiner is planar.

16. The head mounted display of claim 1, wherein the freeform combiner is disposed in a field of view of the user when the head mounted display system is worn by the user.

17. The method of claim 11 wherein the freeform combiner is disposed in a field of view of the user when the head mounted display system is worn by the user.

* * * * *